(12) United States Patent
Song et al.

(10) Patent No.: US 11,777,550 B2
(45) Date of Patent: Oct. 3, 2023

(54) DEVICE CRADLE

(71) Applicant: 3i Inc., Daegu (KR)

(72) Inventors: Hun Joo Song, Seoul (KR); Dong Hee Lee, Seoul (KR); Fernando Carrasco Ferretti, Seoul (KR); Seo Jae Kweon, Seoul (KR); Ji Soo Kang, Gyeonggi-do (KR); Ken Kim, Seoul (KR); Ji Wuck Jung, Gyeonggi-do (KR)

(73) Assignee: 3i Inc., Daegu (KR)

( * ) Notice: Subject to any disclaimer, the term of this patent is extended or adjusted under 35 U.S.C. 154(b) by 0 days.

(21) Appl. No.: 17/870,776

(22) Filed: Jul. 21, 2022

(65) Prior Publication Data

US 2023/0139965 A1   May 4, 2023

(30) Foreign Application Priority Data

Oct. 28, 2021   (KR) .................. 20-2021-0003287

(51) Int. Cl.
*H04B 1/3877* (2015.01)
*G06F 1/16* (2006.01)
*H04M 1/04* (2006.01)

(52) U.S. Cl.
CPC ......... *H04B 1/3877* (2013.01); *G06F 1/1632* (2013.01); *H04M 1/04* (2013.01)

(58) Field of Classification Search
CPC ........ G06F 3/041; G06F 3/1454; G06F 3/167; G06F 1/1632; G06F 1/263; G06F 18/214; G06F 21/32; G06F 21/572; G06F 21/88; G06F 3/017; G06F 3/165; G06F 8/65; G06F 1/163; H04B 5/0031; H04B 5/0037; H04B 5/00; H04B 5/0056; H04B 1/385; H04B 1/3883; H04B 5/0081; H04B 5/0093; H04B 5/02
USPC ...................................... 455/575.1
See application file for complete search history.

(56) References Cited

U.S. PATENT DOCUMENTS

| 2015/0333789 | A1* | 11/2015 | An ....................... B60R 11/0241 455/575.9 |
| 2016/0091926 | A1* | 3/2016 | Saxton .................. G06F 1/1632 710/304 |
| 2017/0072872 | A1* | 3/2017 | Balmer .................. B60R 11/02 |

FOREIGN PATENT DOCUMENTS

| KR | 100778926 | 11/2007 |
| KR | 20120010706 | 2/2012 |
| KR | 101447518 | 10/2014 |
| KR | 20190075694 | 7/2019 |
| KR | 20210102143 | 8/2021 |

* cited by examiner

*Primary Examiner* — Ajibola A Akinyemi
(74) *Attorney, Agent, or Firm* — JCIPRNET

(57) ABSTRACT

Provided is a device cradle. The device cradle includes a fixer for fixing a device, a body portion including a main body and a penetrating groove which is formed to penetrate the main body from a top surface of the main body and accommodates at least a portion of the fixer, and a first driving portion for rotating the fixer by a specified angle around a horizontal axis with respect to the body portion, wherein the penetrating groove has a spherical shape, and wherein at least part of the fixer may be formed in a spherical shape.

9 Claims, 10 Drawing Sheets

DEVICE CRADLE

CROSS-REFERENCE TO RELATED APPLICATION

This application claims the benefit of Korean Patent Application No. 20-2021-0003287, filed on Oct. 28, 2021, in the Korean Intellectual Property Office, the entire disclosure of which is incorporated herein by reference for all purposes.

BACKGROUND

1. Field of the Invention

One or more example embodiments relate to a device cradle.

2. Description of the Related Art

Mobile phones generally manufactured for the purpose of long-distance communication are added with camera function in addition to the traditional communication function following technological development, and thus taking pictures or videos has become possible. In particular, as remote communication of pictures and videos has become possible with the spread of smart phones, generating and sharing image information with mobile phones instead of existing portable cameras are becoming more frequent.

However, a mobile phone with a camera function may take photos unclearly due to shaking and taking a video for a long time while holding a mobile phone is inconvenient.

In order to resolve such an inconvenience, users recently take pictures using a selfie stick and a tripod. However, in the case of video recording, there was an inconvenience of having to move according to and together with the movement of the object, and in this case, recording a clear video was difficult because stable video recording was difficult.

Thus, there is a need for a device cradle that rotates the device so that a moving object is included in the screen of the user device when the object moves.

The above description is information the inventor(s) acquired during the course of conceiving the present disclosure, or already possessed at the time, and is not necessarily art publicly known before the present application was filed.

SUMMARY

An aspect provides a device cradle capable of holding a device.

Another aspect provides a device cradle capable of vertical and/or horizontal rotation.

Another aspect provides a device cradle that may be used regardless of the type or size of a device.

According to an aspect, there is provided a device cradle including a fixer configured to fix a device, a body portion including a main body and a penetrating groove which is formed to penetrate the main body from a top surface of the main body and accommodates at least a portion of the fixer, and a first driving portion configured to rotate the fixer by a specified angle around a horizontal axis with respect to the body portion, wherein the penetrating groove has a spherical shape, and wherein at least part of the fixer is formed in a spherical shape.

The first driving portion may include a motor configured to generate a torque and at least one gear configured to transmit the torque.

The first driving unit may include a first gear, a first motor which is fixed to the main body and configured to rotate the first gear around the horizontal axis, and a connector which is disposed between the first gear and fixer and configured to transmit the torque which is transmitted from the first gear to the fixer.

The connection member may have a tooth formed on one side of the connection member configured to connect to the first gear and may be formed to be flat on the other side to connect to the fixer.

The main body includes a first body and a second body which is disposed on the upper part of the first body, and may include a second driving portion configured to rotate the second body by a specified angle around a vertical axis with respect to the first body.

The second driving portion may include a motor configured to generate torque and at least one gear configured to transmit the torque.

The second driving portion may include a first rotating portion which is fixed to the first body, a second rotating portion which is fixed to the second body and includes a tooth formed on an inner circumferential surface, a worm, a second motor which is fixed to the first rotating portion and configured to rotate the worm around the horizontal axis, a worm wheel which is connected to the worm by a worm gear method and configured to rotate around the vertical axis, and at least one second gear which rotates around the vertical axis, disposed between the worm wheel and the tooth formed on the inner circumferential surface of the second rotating portion, and transmits the torque transmitted from the worm wheel to the second rotating portion.

The fixer may include a fixing frame, a fixing groove which is formed to be recessed from one side of the fixing frame, a gripping portion which is disposed inside the fixing groove and configured to grip the device, and a distance-adjusting portion configured to adjust a fixed distance, which is the distance between one side of the fixing groove and the gripping portion.

The distance-adjusting portion connects to the gripping portion, penetrates the fixing frame, connects to the fixing frame via thread-connection, and adjusts the fixed distance as the distance-adjusting portion rotates around a rotation axis.

According to example embodiments, a device cradle capable of easily adjusting a location of a device may be provided.

The effects of the device cradle are not limited to the above-mentioned effects, and other effects may be clearly understood from the above description by those having ordinary skill in the art to which the present disclosure pertains.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

Figure 1:
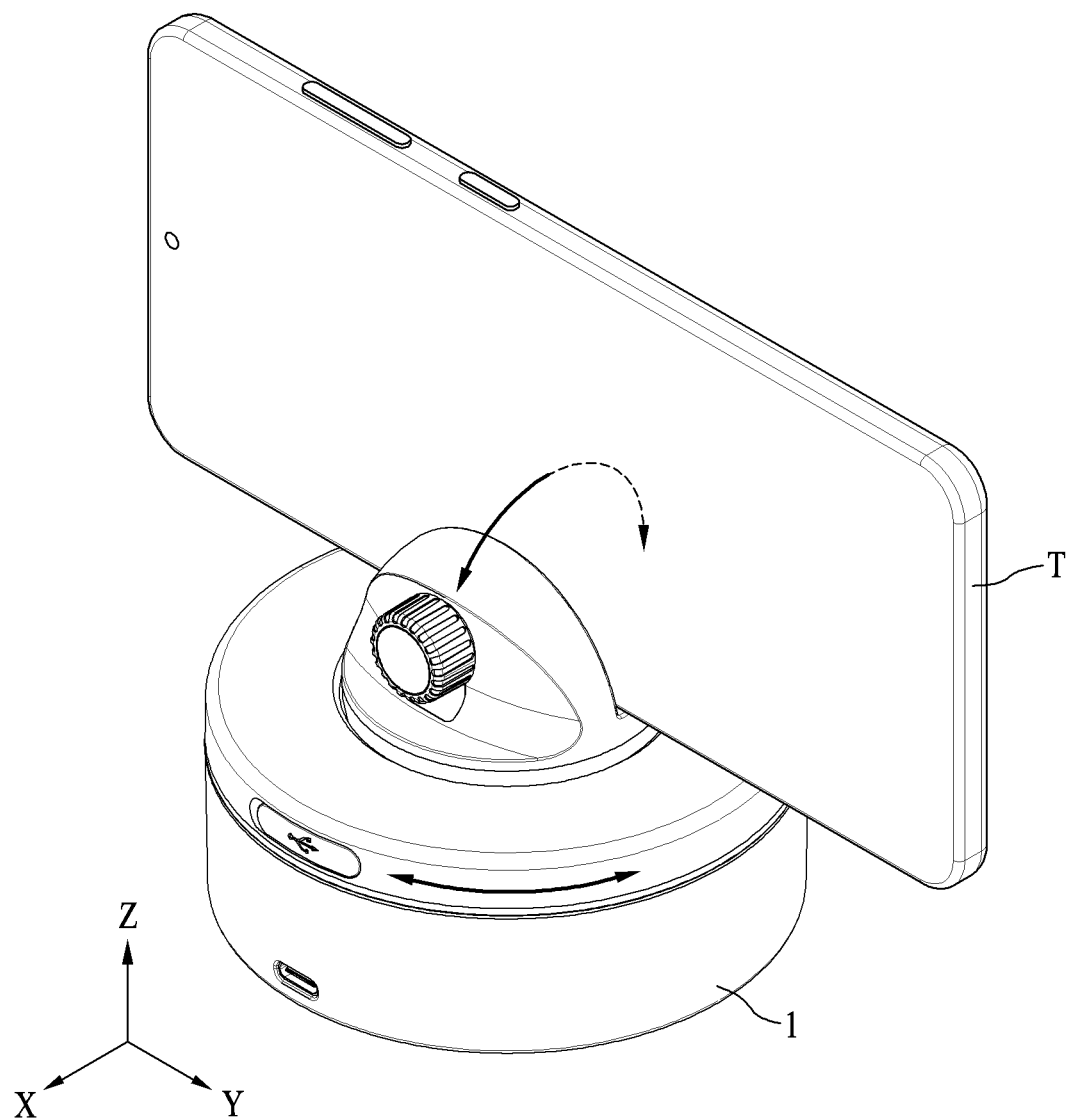
FIG. 1 is a perspective view illustrating a state of use of a device cradle according to an example embodiment.

The accompanying drawings illustrate preferred example embodiments of the present disclosure, and are provided together with the detailed description for better understanding of the technical idea of the present disclosure. Therefore, the present disclosure should not be construed as being limited to the example embodiments set forth in the drawings.

DETAILED DESCRIPTION

Hereinafter, examples will be described in detail with reference to the accompanying drawings. However, various alterations and modifications may be made to the examples. Thus, the examples are not construed as limited to the example embodiment set forth herein. The examples should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of the examples, a detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected," "coupled," or "attached" to another constituent element, it should be understood that one constituent element may be connected or attached directly to another constituent element, and an intervening constituent element may also be "connected," "coupled," or "attached" to the constituent elements.

The same name may be used to describe an element included in the examples described above and an element having a common function. Unless otherwise mentioned, the descriptions of the examples may be applicable to the following examples and thus, duplicated descriptions will be omitted for conciseness.

Figure 2:
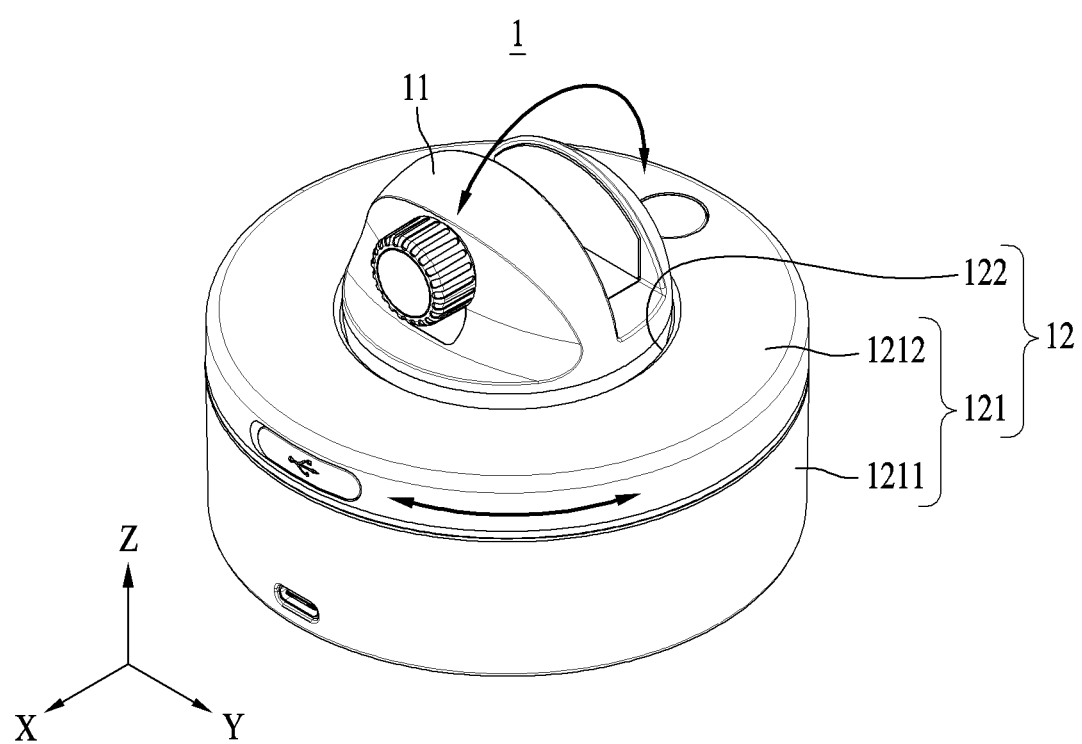
FIG. 2 is a perspective view of a device cradle according to an example embodiment.

FIG. 1 is a perspective view illustrating a state of use of a device cradle according to an example embodiment, and FIG. 2 is a perspective view of a device cradle according to an example embodiment.

Referring to FIGS. 1 and 2, a device cradle 1 may rotate a device (e.g., a terminal) T horizontally and/or vertically while the device T is mounted thereto. In an example embodiment, the device cradle 1 may include a fixer 11 and a body portion 12.

The fixer 11 may fix the device T. The device T may include, for example, a portable device, a smartphone, a tablet, a language-learning device, an e-book, and the like, but is not limited thereto. In an example embodiment, the fixer 11 may rotate around a horizontal axis (e.g., y axis) with respect to the body portion 12 by a first driving portion 13. The body portion 12 and the first driving portion 13 will be described later. As the fixer 11 rotates, the device T may also rotate around the horizontal axis (e.g., y-axis). Accordingly, the device T may be tilted in a vertical direction so that a moving object is included in a screen of the device T. In an example embodiment, at least a portion of the fixer 11 may be formed in a spherical shape. For example, the fixer 12 may have a portion that is exposed to the outside of the body portion 12, at least a portion of which may be formed in a spherical shape.

The body portion 12 may include a main body 121 and a penetrating groove 122.

In an example embodiment, the main body 121 may support the fixer 11 from the ground and accommodate various components including electronic components. For example, the main body 121 may be formed in a cylindrical shape, which is provided merely as an example. The shape of the main body 121 is not limited to the foregoing example. For example, the main body 121 may be formed in various ways according to an environment in which the device T is mounted.

In an example embodiment, the penetrating groove 122 may be formed to penetrate through an upper surface of the main body 121 to accommodate at least a portion of the fixer 11. In an example embodiment, the penetrating groove 122 may be formed in a shape corresponding to a cross-section (e.g., a cross-section perpendicular to a z axis) of the fixer 11, thereby minimizing a gap between the main body 121 and the fixer 11 and preventing an inflow of foreign substances while improving an outer appearance in view. For example, the penetrating groove 122 may be formed in a circular shape. Accordingly, when the penetrating groove 122 is formed in the circular shape, the fixer 11 having at least a portion formed in a spherical shape may rotate without interference with the main body 121 while being accommodated in the penetrating groove 122. In an example embodiment, the main body 121 may include a first body 1211 and a second body 1212.

In an example embodiment, the first body 1211 may form a lower portion of the main body 121, and the second body 1212 may form an upper portion of the main body 121. The second body 1212 may be disposed on the first body 1211.

In an example embodiment, the second body 1212 may rotate around a vertical axis (e.g., the z axis) with respect to the first body 1211 by a second driving portion 14 to be described later. As a second rotating portion 142 rotates, the device T may also rotate around the vertical axis (e.g., the z axis). When the device T rotates together with the second body 1212, a moving object (e.g., an object) may be continuously captured through a camera.

Figure 3:
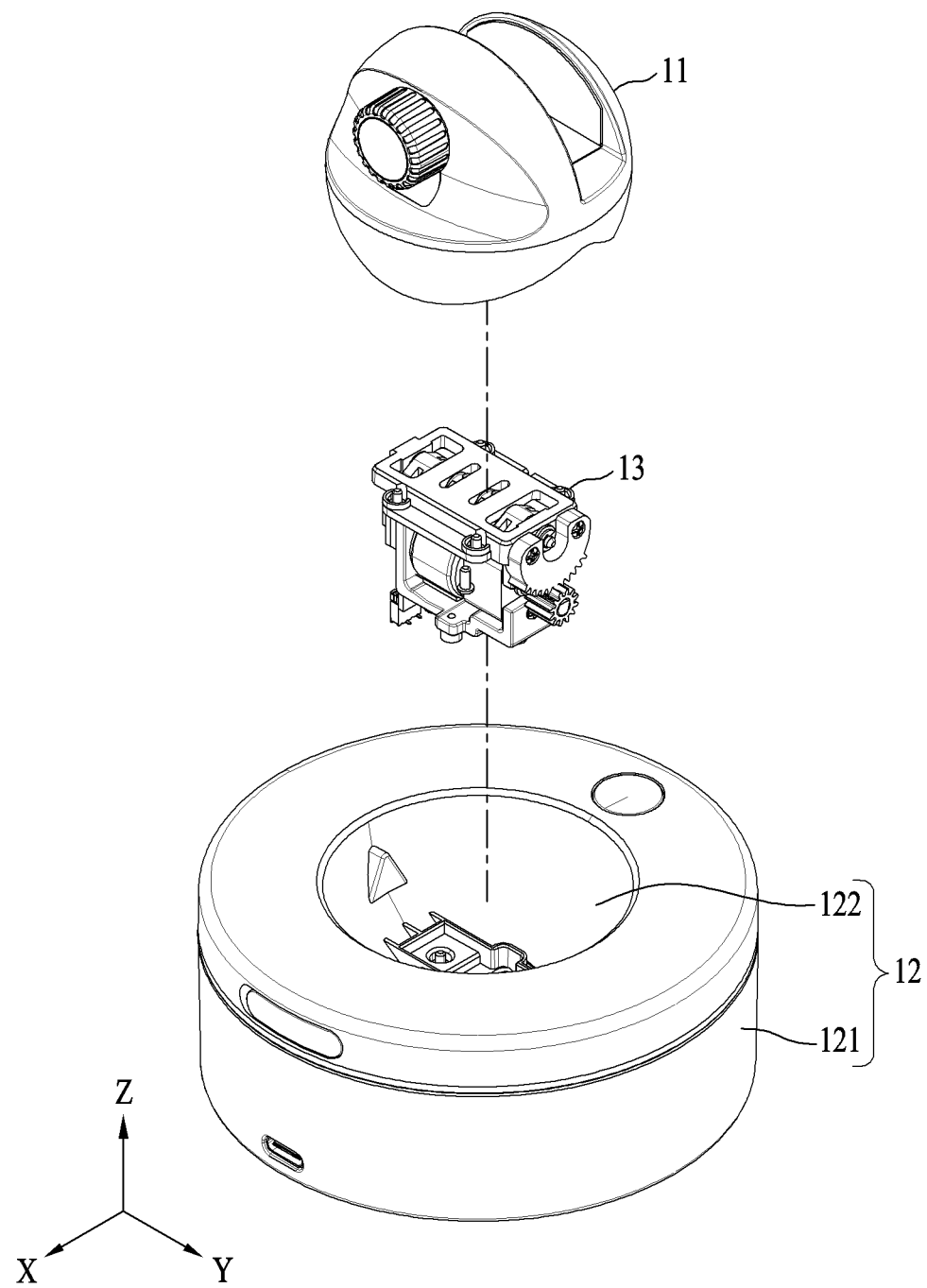
FIG. 3 is an exploded perspective view of a device cradle according to an example embodiment.
Figure 4:
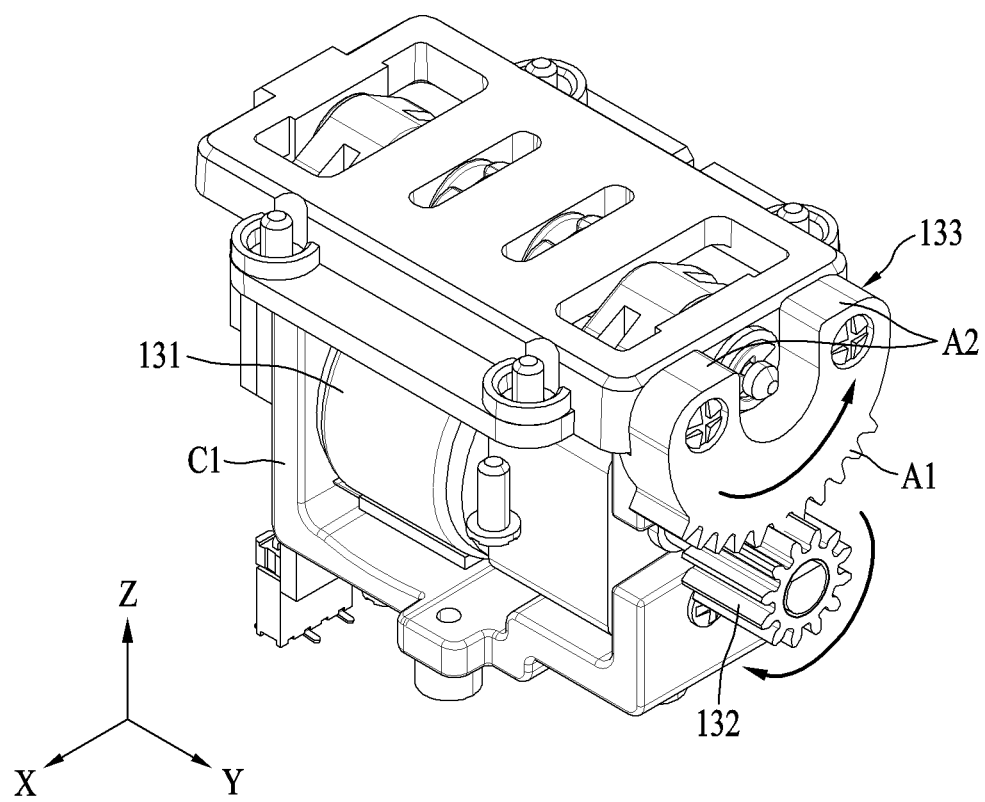
FIG. 4 is a perspective view of a first driving portion according to an example embodiment.
Figure 5A:
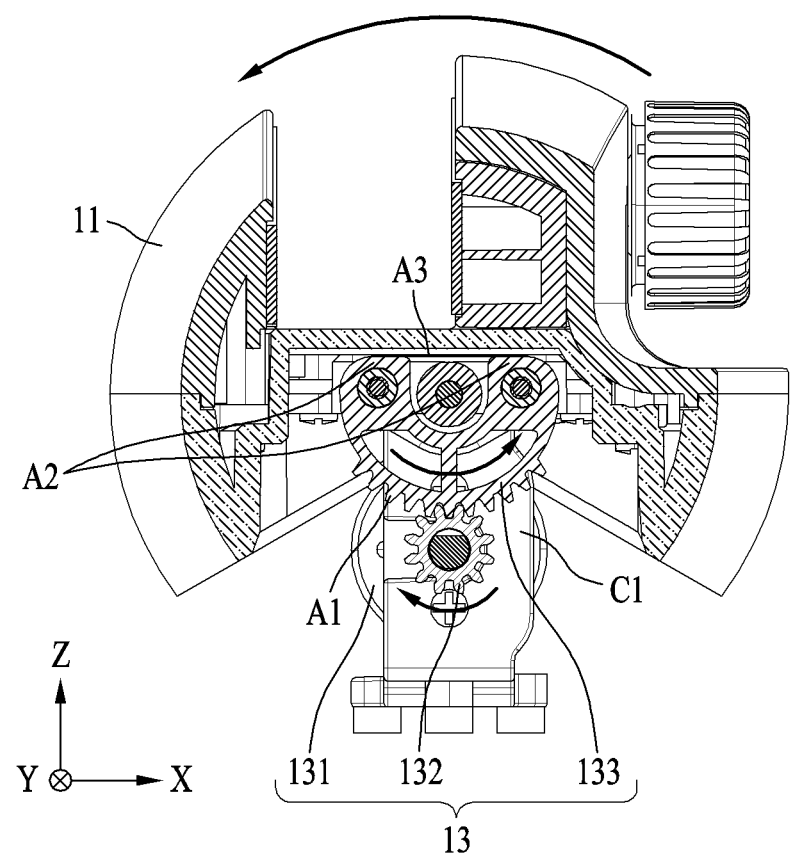
FIGS. 5A and 5B are views illustrating operations of a first driving portion according to an example embodiment.
Figure 5B:
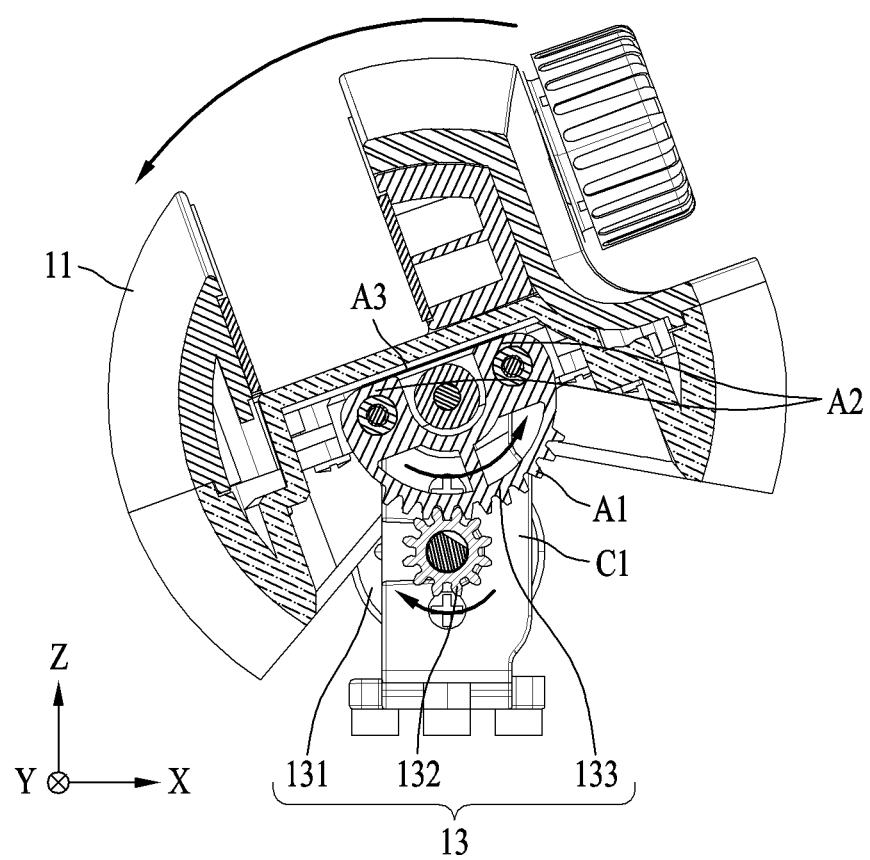

FIG. 3 is an exploded perspective view of the device cradle 1 according to an example embodiment, FIG. 4 is a perspective view of the first driving portion 13 according to an example embodiment, and FIGS. 5A and 5B are views illustrating operations of the first driving portion 13 according to an example embodiment.

Referring to FIGS. 3 to 5B, the first driving portion 13 may be accommodated in an inner space of the body portion 12 and the fixer 11, and may rotate the fixer 11 by a specified angle around the horizontal axis (e.g., the y axis) with respect to the body portion 12. Rotating the fixer 11 by the angle around the horizontal axis (e.g., the y axis) with respect to the body portion 12 may be tilting the fixer 11 with respect to the body portion 12.

In an example embodiment, the first driving portion 13 may include a motor, gear, and connection member 133.

The motor may generate a torque for driving the first driving portion 13. In an example embodiment, the motor may rotate the gear connected to the motor by a specified angle around a rotation axis. For example, the angle may be formed by the device T connected to the device cradle 1 through a short-range wireless communication. For example, the first driving portion 13 may include a first motor 131 that rotates a first gear 132 to be described later in a clockwise and/or counterclockwise direction by a specified angle around the horizontal axis (e.g., the y axis). In an example embodiment, the first motor 131 may be fixed to the main body 121. For example, the first motor 131 may be fixed to a first motor case C1, and the first motor case C1 may be fixed to at least a portion of the main body 121. However, examples are not limited thereto, and how the first motor 131 is fixed to the main body 121 is not limited to the foregoing example. For example, the first motor 131 may be fixed in such a way that the first motor 131 is directly attached to the main body 121.

The gear may be formed in a cylindrical shape with a tooth formed on an outer surface thereof. In an example embodiment, the gear may transmit the torque generated from the motor, and at least one gear may be provided. In an example embodiment, the first driving portion 13 may include the first gear 132. The first gear 132 may be formed as a spur gear and be fixed to the first motor 131, and may rotate around the horizontal axis (e.g., the y axis) by the first motor 131. The first gear 132 may thus receive the torque generated from the first motor 131.

The connecting member 133 may be disposed between the first gear 132 and the fixer 11, and may transmit the torque transmitted from the first gear 132 to the fixer 11. In an example embodiment, the connecting member 133 may have a tooth A1 formed on one side thereof to be connected to the first gear 132. In an example embodiment, a tooth of the first gear 132 and the tooth A1 of the connecting member 133 may engage with each other. Accordingly, as the first gear 132 rotates around the horizontal axis (e.g., the y axis), the connecting member 133 may also rotate around the horizontal axis (e.g., the y axis). For example, when the first gear 132 rotates clockwise around the horizontal axis (e.g., the y axis), the connecting member 133 may rotate counterclockwise around the horizontal axis (e.g., the y axis). In other words, the first gear 132 may transmit, to the connecting member 133, the torque received from the first motor 131.

In an example embodiment, the other side of the connecting member 133 may be formed flat (e.g., A2) to be connected to the fixer 11. For example, a cross-section (e.g., a cross-section perpendicular to the y axis) of the connecting member 133 may include a semispherical cross-section. In an example embodiment, the other side of the connecting member 133 which is formed as a flat surface A2 may be connected to at least a portion of the fixer 11. For example, the other side of the connection member 133 may be in contact with a flat surface A3 of the fixer 11. Accordingly, as the connecting member 133 rotates around the horizontal axis (e.g., the y axis), the fixer 11 may also rotate around the horizontal axis (e.g., the y axis). For example, when the connecting member 133 rotates counterclockwise around the horizontal axis (e.g., the y axis), the connecting member 133 may also rotate counterclockwise around the horizontal axis (e.g., the y axis). In other words, the connecting member 133 may transmit, to the fixer 11, the torque received from the first gear 132.

Figure 6:
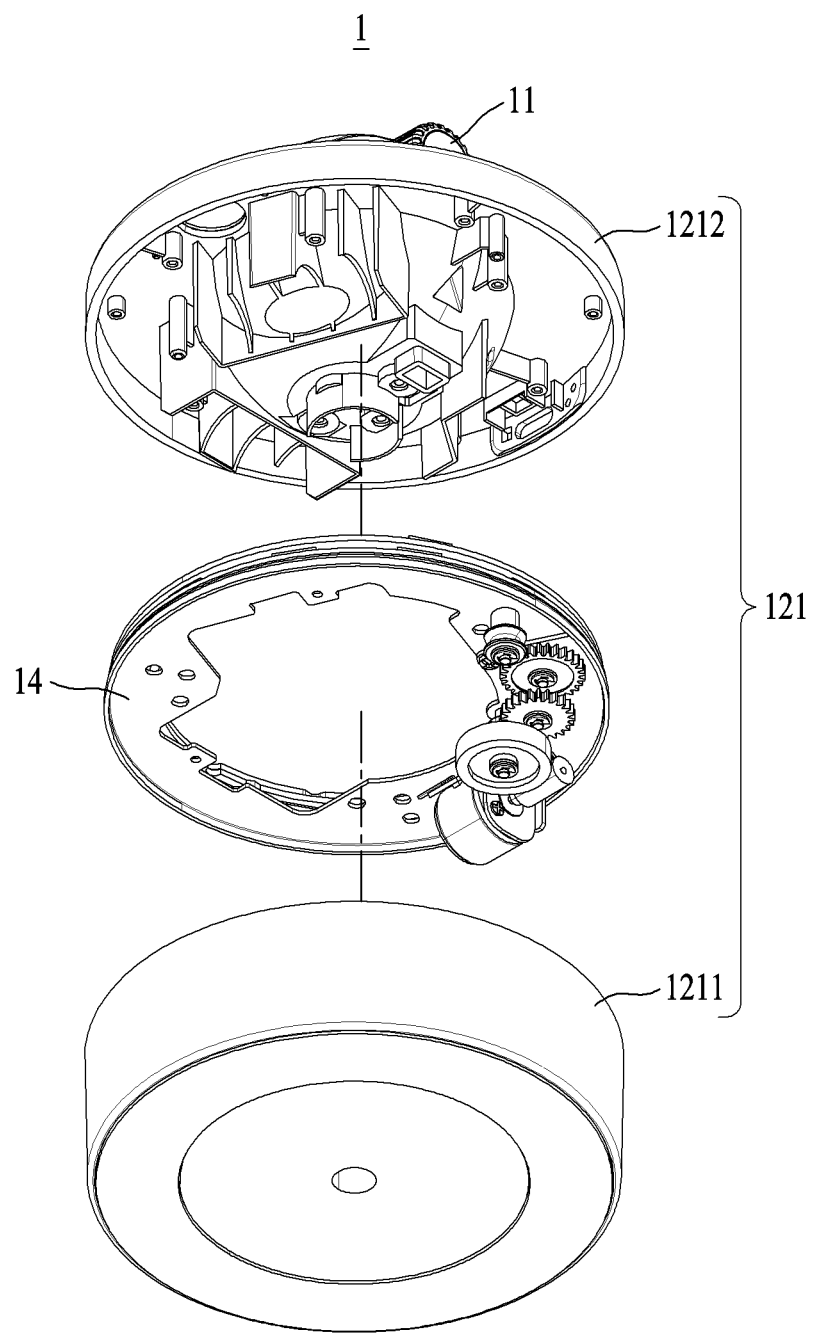
FIG. 6 is an exploded perspective view of a device cradle according to an example embodiment.
Figure 7:
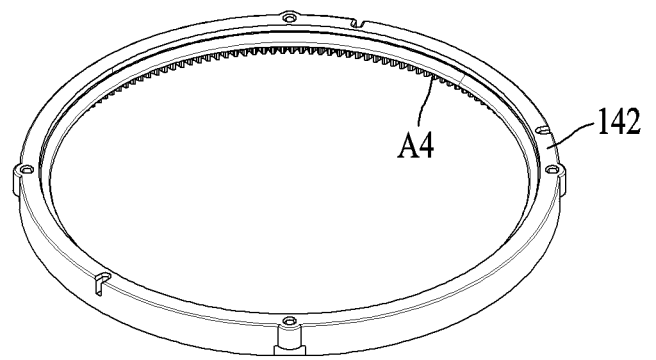
FIG. 7 is an exploded perspective view of a second driving portion according to an example embodiment.
Figure 7:
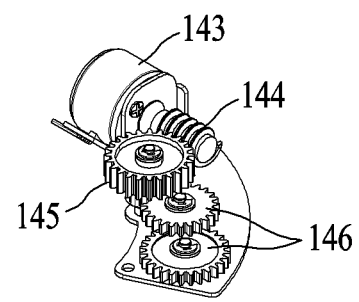
Figure 7:
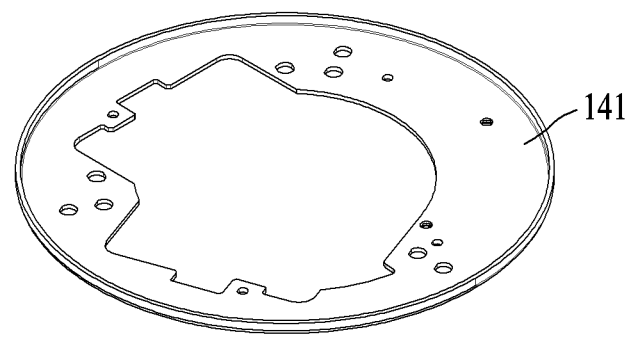
Figure 7:
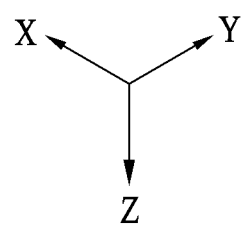
Figure 8:
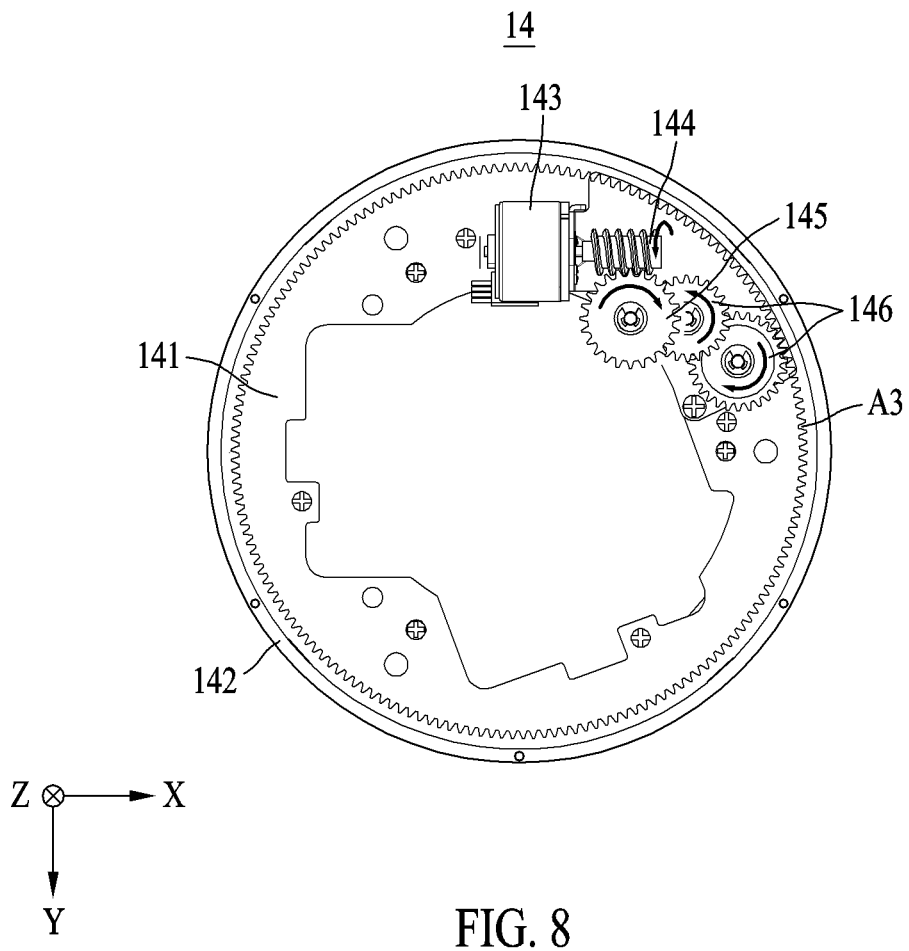
FIG. 8 is a plan view of a second driving portion viewed from above according to an example embodiment.
Figure 9:
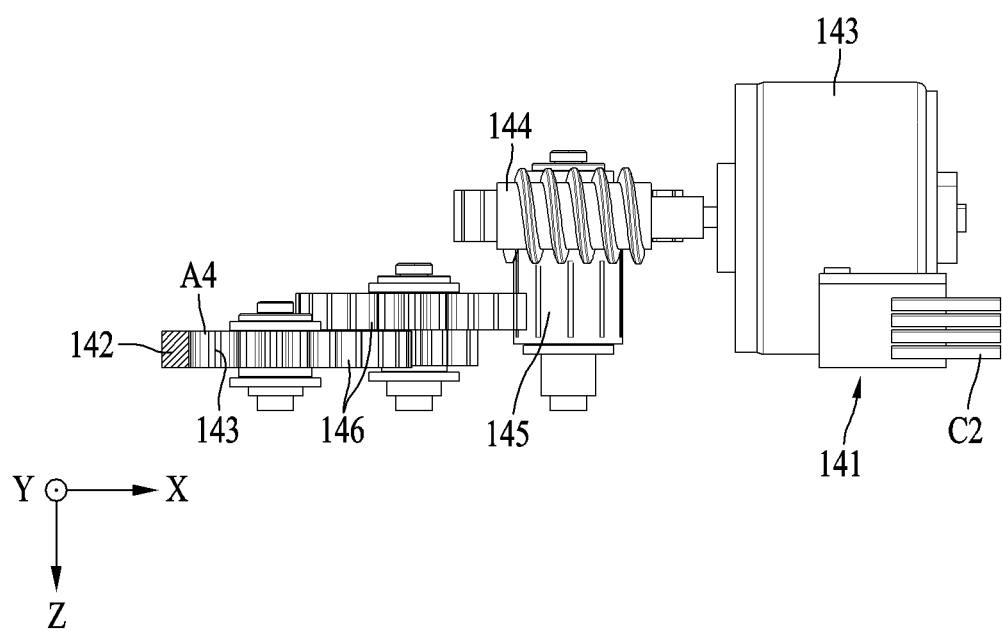
FIG. 9 is a plan view of a second driving portion viewed from side according to an example embodiment.

FIG. 6 is an exploded perspective view of the device cradle 1 according to an example embodiment, FIG. 7 is an exploded perspective view of the second driving portion 14 according to an example embodiment, FIG. 8 is a plan view of the second driving portion 14 viewed from above according to an example embodiment, and FIG. 9 is a plan view of the second driving portion 14 viewed from side according to an example embodiment.

Referring to FIGS. 6 to 9, the second driving portion 14 may be accommodated in an inner space of the body portion 12, and may rotate the second body 1212 by a specified angle around the vertical axis (e.g., the z axis) with respect to the first body 1211. In an example embodiment, the second driving portion 14 may include a first rotating portion 141, the second rotating portion 142, a motor, and a gear. For example, the angle may be determined by the device T connected with the device cradle 1 through short-range wireless communication.

The first rotating portion 141 may be fixed to the first body 1211. For example, the first rotating portion 141 may be accommodated in an inner space of the first body 1211 and be fixed to at least a portion of the first body 1211. In an example embodiment, the first rotating portion 141 may provide a space in which the motor, the gear, and the second rotating portion 142 may be disposed. For example, to the first rotating portion 141, a second motor 143, a rotation axis of a worm wheel 145, and a rotation axis of a second gear 146 may be fixed, and the second rotating portion 142 may be connected. For example, a cross-section (e.g., a cross-section perpendicular to the z axis) of the first rotating portion 141 may be formed in a circular shape, but is not limited thereto.

The second rotating portion 142 may be connected to the first rotating portion 141 and fixed to the second body 1212. In an example embodiment, the second rotating portion 142 may have a tooth A4 formed on its inner circumferential surface. In an example embodiment, as the tooth A4 formed on the inner circumferential surface of the second rotating portion 142 and the second gear 146 to be described later are engaged, the second rotating portion 142 may rotate around the vertical axis (e.g., the z axis) with respect to the first rotating portion 141. For example, a cross-section (e.g., a cross-section perpendicular to the z axis) of the second rotating portion 142 may be formed in a circular shape, but is not limited thereto.

The motor may generate a torque for driving the second driving portion 14. In an example embodiment, the motor may rotate the gear connected to the motor by a specified angle around a rotation axis. For example, the second driving portion 14 may include the second motor 143 that rotates a worm 144, which will be described later, in a clockwise and/or counterclockwise direction by a specified angle around the horizontal axis (e.g., an x axis). In an example embodiment, the second motor 143 may be fixed to the first rotating portion 141. For example, the second motor 143 may be fixed to a second motor case C2 and the second motor case C2 may be fixed to at least a portion of the first rotating portion 141. However, examples are not limited to the foregoing example, and the second motor may be fixed in such a way that it is directly attached to the first rotating portion 141.

The gear may be formed in a cylindrical shape with a tooth formed on an outer surface thereof. In an example embodiment, the gear may transmit the torque generated from the motor, and at least one gear may be provided. In an example embodiment, the first driving portion 13 may include the worm 144, the worm wheel 145, and the second gear 146.

In an example embodiment, the worm 144 may be fixed to the first motor 131, and may rotate by a specified angle around the horizontal axis (e.g., an x axis) by the first motor 131. Accordingly, the worm 144 may receive the torque generated from the first motor 131.

In an example embodiment, the worm wheel 145 may be connected to the first gear 132 in the worm gear 144 method. In an example embodiment, tooth of the worm 144 and tooth of the worm wheel 145 may engage with each other. Accordingly, as the worm 144 rotates around the horizontal axis (eg, the x axis), the worm wheel 145 may rotate around the vertical axis (eg, the z axis). In other words, the worm 144 may transmit the torque received from the first motor 131 to the worm wheel 145.

In an example embodiment, the second gear 146 rotates around the vertical axis (eg, the z axis), is disposed between the tooth A4 formed on the inner circumferential surface of the second rotating portion 142 and the worm wheel 145, and may transmit the torque received from the worm wheel 145 to the second rotating portion 142. In an example embodiment, at least one second gear 146 may be provided. For example, two second gears 146 may be provided, and the two second gears 146 may be disposed to engage with each other. In addition, one second gear 146 engages with the spur gear provided in the lower portion of the worm wheel 145, and the other second gear 146 may engage with the tooth A4 formed on the inner circumferential surface of the second rotating portion 142. Accordingly, as the worm wheel 145 rotates clockwise, each of the two second gears 146 rotates counterclockwise and clockwise, and finally the second rotating portion 142 may rotate clockwise. In other words, torque generated from the second motor 143 may be transmitted to the second rotating portion 142.

In an example embodiment, as the second motor 143 is driven in a state in which the first rotating portion 141 is fixed to the first body 1211 and the second rotating portion 142 is fixed to the second body 1212, the second rotating portion 142 may rotate around the vertical axis (eg, the z axis) with respect to the first rotating portion 141. Accordingly, the second body 1212 may rotate around the vertical axis (eg, the z axis) with respect to the first body 1211.

Figure 10A:
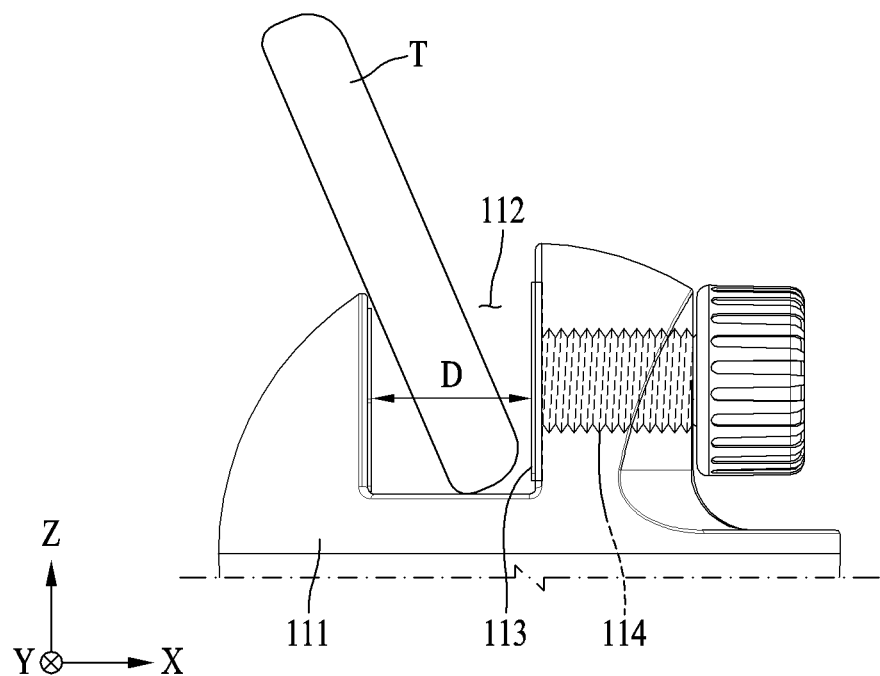
FIGS. 10A and 10B are views illustrating operations of a fixer according to an example embodiment.
Figure 10B:
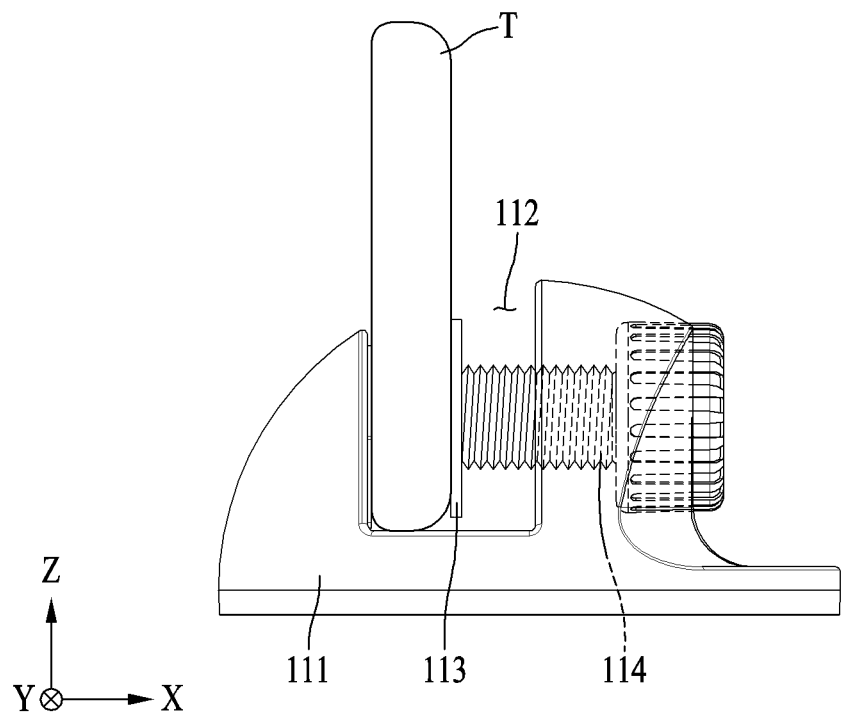

FIGS. 10A and 10B are operational views of the fixer 11 according to an example embodiment.

Referring to FIGS. 10A and 10B, the fixer 11 according to an embodiment may fix the device T. In an example embodiment, the fixer 11 may include a fixing frame 111, a fixing groove 112, a gripping member 113, and a distance-adjusting portion 114.

The fixing frame 111 may form an outer surface of the fixer 11.

The fixing groove 112 may be formed to be recessed from one side of the fixing frame 111. For example, the fixing groove 112 may be recessed from the upper surface of the fixer 11 by a predetermined length. For example, cross-section (eg, a cross-section perpendicular to the x axis) of the fixing groove 112 may be formed in a semispherical shape. In an example embodiment, one side of the fixing groove 112 may be in contact with at least a portion of the device T. For example, in order to effectively grip the device T, one side of the fixing groove 112 is formed to be flat, and may be made of a material with high friction. However, this is an example, and the shape and material of the fixing groove 112 are not limited to the foregoing embodiment.

The gripping member 113 is disposed inside the fixing groove 112 and may grip the device T. In an example embodiment, the holding member 113 may be formed in a shape corresponding to a cross-section (eg, a cross-section perpendicular to the x axis) of the fixing groove 112. For example, a cross-section (eg, a cross-section perpendicular to the x axis) of the gripping member 113 may be formed in a semispherical shape. In an example embodiment, the holding member 113 may be in contact with at least a portion of the device T. For example, for effective gripping of the device T, the gripping member 113 is formed in a way that at least a part of it is flat, and may be provided with a material with high friction; the shape and material of the gripping member 113 are not limited to the foregoing embodiment.

Distance adjusting unit 114 may adjust a fixed distance D, which is a distance between one side of the fixing groove 112 and gripping member 113. For example, distance adjusting unit 114 may be connected to the holding member 113 and disposed to pass through the fixed frame. In addition, distance adjusting unit 114 may be connected to the fixing frame 111 via thread-connection. Accordingly, as the distance adjusting unit 114 rotates around the rotation axis, the fixed distance D may be adjusted. For this reason, the user may adjust the fixed distance D by rotating the distance adjusting unit 114 around the rotation axis. In FIG. 10A, the user may insert the device T between one side of the fixing groove 112 and the gripping member 113 by adjusting the fixing distance to be longer than the thickness of the device T. In addition, in FIG. 10B, the user may adjust the fixing distance to correspond to the thickness of the device T so that one side of the fixing groove 112 and the gripping member 113 grip the device T.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A device cradle, comprising:
a fixer configured to fix a device;
a body portion comprising a main body and a penetrating groove formed to penetrate from a top surface of the main body and accommodating at least a portion of the fixer, wherein at least part of the fixer exposed to an outside the body portion is formed in a spherical shape; and
a first driving portion connected to a flat surface of inside the fixer accommodated in the penetrating groove and configured to tilt the flat surface by a specified angle around a horizontal axis with respect to the body portion,
wherein the penetrating groove is formed in a circular shape, and
an area of the fixer accommodated in the penetrating groove changes as the flat surface of inside the fixer is tilted by the first driving portion.

2. The device cradle of claim 1, wherein the first driving portion comprises a motor configured to generate a torque and at least one gear configured to transmit the torque.

3. The device cradle of claim 2, wherein the first driving portion comprises:
a first gear;
a first motor fixed to the main body and configured to rotate the first gear around the horizontal axis; and
a connecting member disposed between the first gear and fixer and configured to transmit, to the fixer, the torque transmitted from the first gear.

4. The device cradle of claim 3, wherein the connecting member has a tooth formed on one side thereof to be connected to the first gear,
wherein another side thereof is formed flat to be connected to the fixer.

5. The device cradle of claim 1, wherein the main body comprises:
a first body; and
a second body disposed on the first body,
the device cradle further comprising:
a second driving portion configured to rotate the second body by a specified angle around a vertical axis with respect to the first body.

6. The device cradle of claim 5, wherein the second driving portion comprises:
a motor configured to generate torque and at least one gear configured to transmit the torque.

7. The device cradle of claim 6, wherein the second driving portion comprises:
a first rotating portion fixed to the first body;
a second rotating portion fixed to the second body and having a tooth formed on an inner circumferential surface;
a worm;
a second motor fixed to the first rotating portion and configured to rotate the worm around the horizontal axis;
a worm wheel connected to the worm by a worm gear method and configured to rotate around the vertical axis; and
at least one second gear configured to rotate around the vertical axis, disposed between the worm wheel and the tooth formed on the inner circumferential surface of the second rotating portion, and configured to transmit, to the second rotating portion, the torque transmitted from the worm wheel.

8. Device cradle of claim 1, wherein the fixer comprises:
a fixing frame;
a fixing groove formed to be recessed from one side of the fixing frame;
a gripping member disposed inside the fixing groove and configured to grip the device; and
a distance adjusting portion configured to adjust a fixed distance which is a distance between one side of the fixing groove and the gripping member.

9. The device cradle of claim 8, wherein the distance adjusting portion is connected to the gripping member, penetrating the fixing frame, and connected to the fixing frame via thread-connection,
wherein the fixed distance is adjusted as the distance adjusting portion rotates around a rotation axis.

* * * * *